(12) United States Patent
Lin et al.

(10) Patent No.: US 8,462,837 B2
(45) Date of Patent: *Jun. 11, 2013

(54) CONSTELLATION-MULTIPLEXED TRANSMITTER AND RECEIVER

(75) Inventors: Thuji Simon Lin, Irvine, CA (US); Steven Jaffe, Irvine, CA (US); Robindra Joshi, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/273,911

(22) Filed: Oct. 14, 2011

(65) Prior Publication Data

US 2012/0275508 A1 Nov. 1, 2012

Related U.S. Application Data

(63) Continuation of application No. 11/835,223, filed on Aug. 7, 2007, now Pat. No. 8,040,941, which is a continuation of application No. 10/045,283, filed on Oct. 18, 2001, now Pat. No. 7,254,167, which is a continuation-in-part of application No. 09/430,466, filed on Oct. 29, 1999, now Pat. No. 6,553,063.

(60) Provisional application No. 60/106,481, filed on Oct. 30, 1998.

(51) Int. Cl.
*H04B 3/46* (2006.01)

(52) U.S. Cl.
USPC ........... 375/224; 375/222; 375/220; 375/356; 375/261; 375/298; 375/302; 375/306; 375/322; 375/324

(58) Field of Classification Search
USPC ................. 375/224, 222, 220, 356, 261, 298, 375/302, 306, 322, 324, 256
See application file for complete search history.

(56) References Cited

U.S. PATENT DOCUMENTS

| 4,761,784 A | 8/1988 | Srinivasagopalan et al. |
| 4,891,806 A | 1/1990 | Farias et al. |

(Continued)

FOREIGN PATENT DOCUMENTS

| EP | 0 490 551 A2 | 6/1992 |
| EP | 0 536 390 B1 | 8/1997 |
| WO | WO 00/27085 | 11/2000 |

OTHER PUBLICATIONS

William Webb and Lajos Hanzo, Chapter 13, "Variable Rate QAM [1]," *Modern Quadrature Amplitude Modulation, Principles and Applications for Fixed and Wireless Communications*, 1994, pp. 384-405, IEEE Press, New York.

(Continued)

*Primary Examiner* — Kabir A Timory
(74) *Attorney, Agent, or Firm* — Sterne, Kessler, Goldstein & Fox, P.L.L.C.

(57) ABSTRACT

A device of dynamic communication of information allows, on the average, non-integer bits per symbol transmission, using a compact code set or a partial response decoding receiver. A stream of selectable predetermined integer bits, e.g., k or k+1 data bits, is grouped into a selectable integer number of bit vectors which then are mapped onto corresponding signal constellations forming transmission symbols. Two or more symbols can be grouped and further encoded, so that a symbol is spread across the two or more symbols being communicated. Sequence estimation using, for example, maximum likelihood techniques, as informed by noise estimates relative to the received signal. Each branch metric in computing the path metric of a considered sequence at the receiver is weighted by the inverse of the noise power. It is desirable that the constellation selection, sequence estimation and noise estimation be performed continuously and dynamically.

20 Claims, 7 Drawing Sheets

U.S. PATENT DOCUMENTS

| | | |
|---|---|---|
| 5,029,185 A | 7/1991 | Wei |
| 5,052,000 A | 9/1991 | Wang et al. |
| 5,103,227 A | 4/1992 | Betts |
| 5,119,403 A | 6/1992 | Krishnan |
| 5,185,763 A | 2/1993 | Krishnan |
| 5,222,077 A | 6/1993 | Krishnan |
| 5,230,010 A | 7/1993 | Betts et al. |
| 5,377,194 A | 12/1994 | Calderbank |
| 5,442,626 A | 8/1995 | Wei |
| 5,541,955 A | 7/1996 | Jacobsmeyer |
| 5,598,435 A | 1/1997 | Williams |
| 5,659,579 A | 8/1997 | Herzberg |
| 5,790,570 A | 8/1998 | Heegard et al. |
| 5,844,944 A | 12/1998 | Betts et al. |
| 5,859,877 A | 1/1999 | Betts et al. |
| 6,005,897 A | 12/1999 | McCallister et al. |
| 6,081,555 A | 6/2000 | Olafsson |
| 6,081,567 A | 6/2000 | Olafsson |
| 6,310,909 B1 | 10/2001 | Jones |
| 6,438,158 B1 | 8/2002 | Zhou et al. |
| 6,553,063 B1 | 4/2003 | Lin et al. |
| 6,882,690 B1 | 4/2005 | Berggren et al. |
| 7,254,167 B2 | 8/2007 | Lin et al. |
| 8,040,941 B2 | 10/2011 | Lin et al. |
| 2004/0057535 A1 | 3/2004 | Strolle et al. |

OTHER PUBLICATIONS

Application Specification Compare Copy showing differences between parent U.S. Appl. No. 09/430,466 and CIP U.S. Appl. No. 10/045,283.

CONSTELLATION-MULTIPLEXED TRANSMITTER AND RECEIVER

CROSS-REFERENCE TO RELATED APPLICATION

This application is a continuation of U.S. Non-Provisional application Ser. No. 11/835,223, filed Aug. 7, 2007, which will issue as U.S. Pat. No. 8,040,941 on Oct. 18, 2011, which is a continuation of U.S. Non-Provisional application Ser. No. 10/045,283, filed Oct. 18, 2001, now U.S. Pat. No. 7,254,167, issued Aug. 7, 2007, which is a continuation-in-part of U.S. Non-Provisional application Ser. No. 09/430,466, filed Oct. 29, 1999, now U.S. Pat. No. 6,553,063, issued Apr. 22, 2003, which claims benefit to U.S. Provisional Application No. 60/106,481, filed Oct. 30, 1998, all of which are incorporated herein by reference in its entirety.

BACKGROUND OF THE INVENTION

1. Field of the Invention

This invention relates to an apparatus and method for communicating information using fractional bits-per-symbol signaling rates responsive to communication channel conditions.

2. Description of the Relevant Art

There exist applications for which it is desirable to transmit transmission symbols that each is composed of a number of information bits which may not represent an integer. The signal constellations associated with such transmissions symbols, then, corresponds to non-power-of-two constellation sizes and/or non-integer constellation sizes.

What is needed is a device that affords fractional bits per symbol digital communication approaching a maximum allowable bit rate yet does so in an efficient manner permitting use of compact code sets, or use of a partial response receiver. Before proceeding with a description of exemplary embodiments, it should be noted that the various digital signaling concepts described herein—with the exception, of course, of the inventive concept itself—are all well known in, for example, the digital radio and voiceband data transmission (modem) arts and thus need not be described in detail herein. These include such concepts as multidimensional signaling using 2N-dimensional channel symbol constellations, where N is some integer; trellis coding; fractional coding; scrambling; passband shaping; equalization; partial response; Viterbi, or maximum-likelihood, decoding; Quadrature Amplitude Modulation(QAM); Orthogonal Frequency Division Multiplexing (OFDM), etc.

SUMMARY OF THE INVENTION

The invention herein provides communication devices affording non-integer bits per symbol digital communication at bit rates approaching optimality for a given set of constraints, using a compact code set or utilizing partial response receiver. In general, the devices which embody the present invention, can include a transmitter, a receiver, or both. These devices manipulate arriving data from a data bit form to a transmission symbol form in a data transformer, advantageously using knowledge of one or more data channel conditions to dynamically and continuously adjust the constellations used to represent the transmitted data. Successive transmission symbols each can contain a varying selectable predetermined integer number of data bits, as governed by a constellation selection controller that is connected with the data transformer. Successive symbols can be transmitted at different time stamps or at different frequency locations. A performance metric estimate can be used to determine which constellation is to be used. A receiver using a sequence estimation technique can optimally decode the received signals given the condition that (i) the soft-decision symbols at the receiver are correlated through the employed channel coding and/or through the introduction of defined partial channel response, and (ii) there exists knowledge of the signal-to-noise ratio (SNR) metric of each soft-decision symbol. Having these techniques, a transmitter, for example, can transmit on the average non-integer information bits per symbol, say between k and k+1, with the multiplexing of a first constellation, representing a first selectable predetermined integer number of data bits, e.g., k bits per symbol, and a second constellation, representing a second selectable predetermined integer number of data bits, e.g., k+1 bits per symbol, such that the desired non-integer information-bit-per-symbol transmission is achieved. It is desired that such multiplexing be done continuously and dynamically. Furthermore, the digital communication facilitated by the invention herein is not limited to temporal sequence transmission (i.e., the time domain) but also can be used in the frequency domain, or both.

DETAILED DESCRIPTION OF EXEMPLARY EMBODIMENTS

The present invention provides for processing communication data using a number of information of data bits per transmission signal, which may be a non-integer, with realizable integer or power-of-two constellation sizes. A forward error correction (FEC) code with a proper code rate can be added such that the information bit rate could further be adapted to a signal constellation size that is an integer or a power-of-two. Depending on the required resolution of the average information bits being transmitted in each symbol, a set of FEC codes can be employed to accommodate the desired code rates. However, this resolution can translate into an undesirably large set of embedded codes needed to achieved the target transmission metrics which, for rate-adaptive applications, complicates the design and rate adaptation procedures. In the invention herein, as few as one fixed trellis code may be used to achieve the desired resolution on the transmission information bits per symbol, simplifying the associated device designs and communication protocols. In the cases where FEC coding is not desirable, or not necessary, the desired resolution on the transmission bits per symbol still can be optimally accommodated through the use of a sequence estimator at its receiver to decode a pre-defined partial response formed for the soft-decision symbols at the receiver.

One application for which this communication data processing may be desirable is rate-adaptive communication service. In a rate adaptive service in which the maximum allowable bit rate is decided before service sessions start and a non-integer bits per symbol might be required to achieve this maximum bit rate. By doing so, non-integer information bits per symbol can be transmitted.

For the purposes herein, the term channel noise will include additive white Gaussian noise, colored Gaussian noise, or both; scintillation noise; shot and impulse noise; all forms of channel attenuation; signal fading and distortion; interference such as intersymbol interference; and any other entity that acts to deviate or disperse the data signal actually received from the data signal originally transmitted, both additive and multiplicative, regardless of stationarity or orthogonality.

Figure 1:
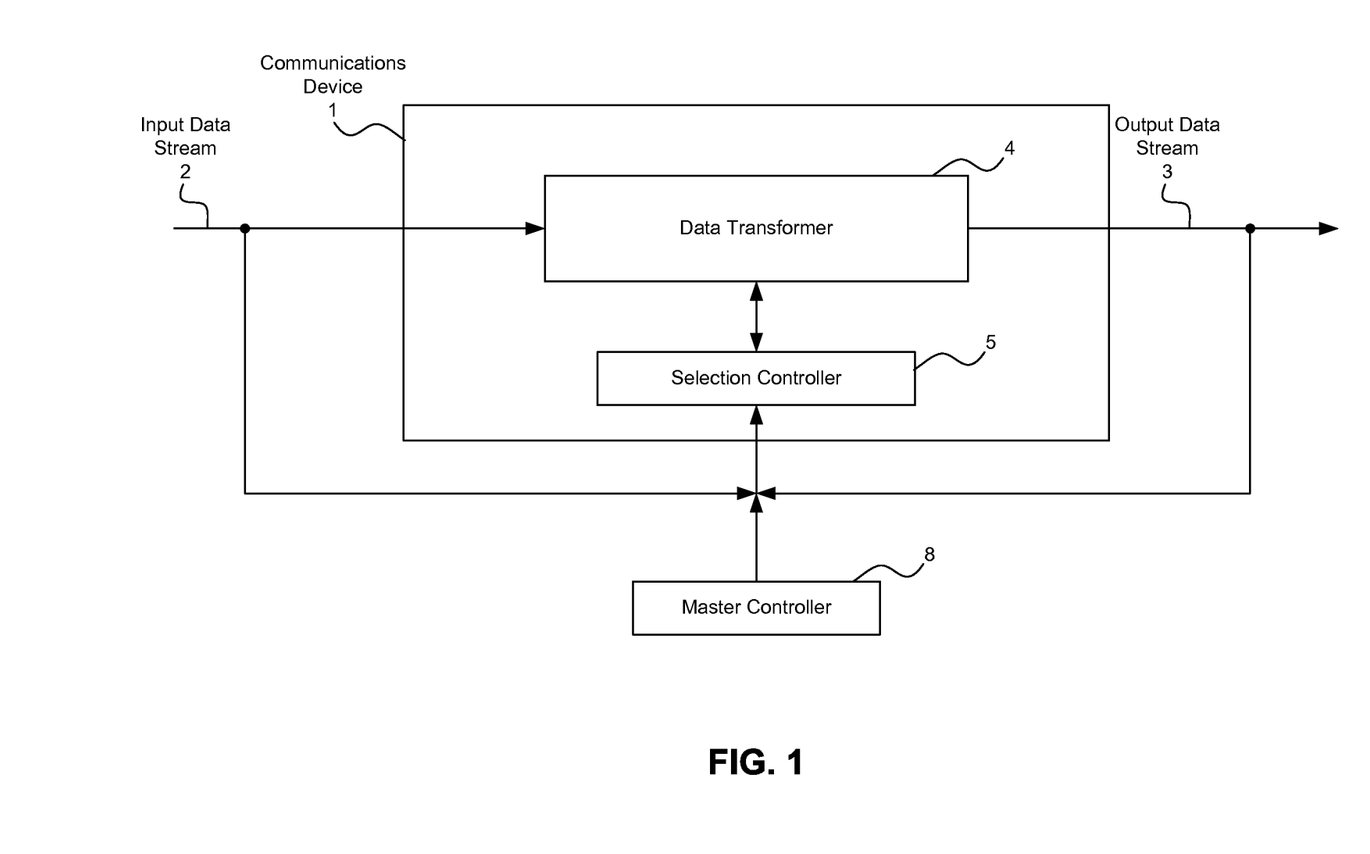
FIG. 1 is an block diagram illustrative of an exemplary embodiment of the present invention.

An exemplary embodiment of the present invention is seen in FIG. 1. Communication device 1 is interposed into a data channel which is represented by communication channel input data stream 2 and communication channel output data stream 3. The data channel can transmit both the desired information as well as undesirable channel noise that is imposed upon the data stream due to one or more channel conditions.

Communication device 1 includes data transformer 4 and controller 5, and can be representative of a transmitter or a receiver. Data transformer 4 manipulates information between data bits and transmission symbols. In an instance where device 1 represents a transmitter, input data stream 2 can be the data bits intended to be transmitted and output data stream 3 can be the transmission symbols transmitted through the data channel. In a case where device 1 represents a receiver, input data stream 2 can be the transmitted symbols as detected at the receiver, and output data stream 3 can be the recovered data bits which correspond to the data bits entering a transmitter. Device 1 is not constrained to operate solely in the time domain, but may operate in other domains including, for example, frequency domain. Also, device 1 is operative where data is both transmitted and received in both time and frequency domains.

According to the present invention, the predetermined integer number of data bits contained in a transmission symbol is selectable, responsive to the channel condition. The selection of the selectable predetermined integer number of data bits in a transmission symbol can be governed by controller 5. It is desired that the channel condition to which controller 5 responds, and by which the selectable predetermined integer number of data bits is selected and processed by data transformer 4, be a preselected channel condition metric. Desirable metrics for the representation of channel condition include the signal-to-noise ratio of the received symbol and/or the power of the noise in a received symbol. The desirable metric may further be restricted by preselected constraints such as, for example, a bit error rate (BER). Data bit selection also can be driven by master controller 8, which may be external to device 1, and which itself may be responsive to a state of the data channel, such as the SNR of the received signal. Where device 1 is a transmitter, controller 8 may be operably connected to a corresponding receiver. It also is desired that channel state monitoring be continuous, and that selection of the selectable predetermined integer number of data bits used to form a transmission symbol be adaptive to a present condition of the data channel.

Figure 2:
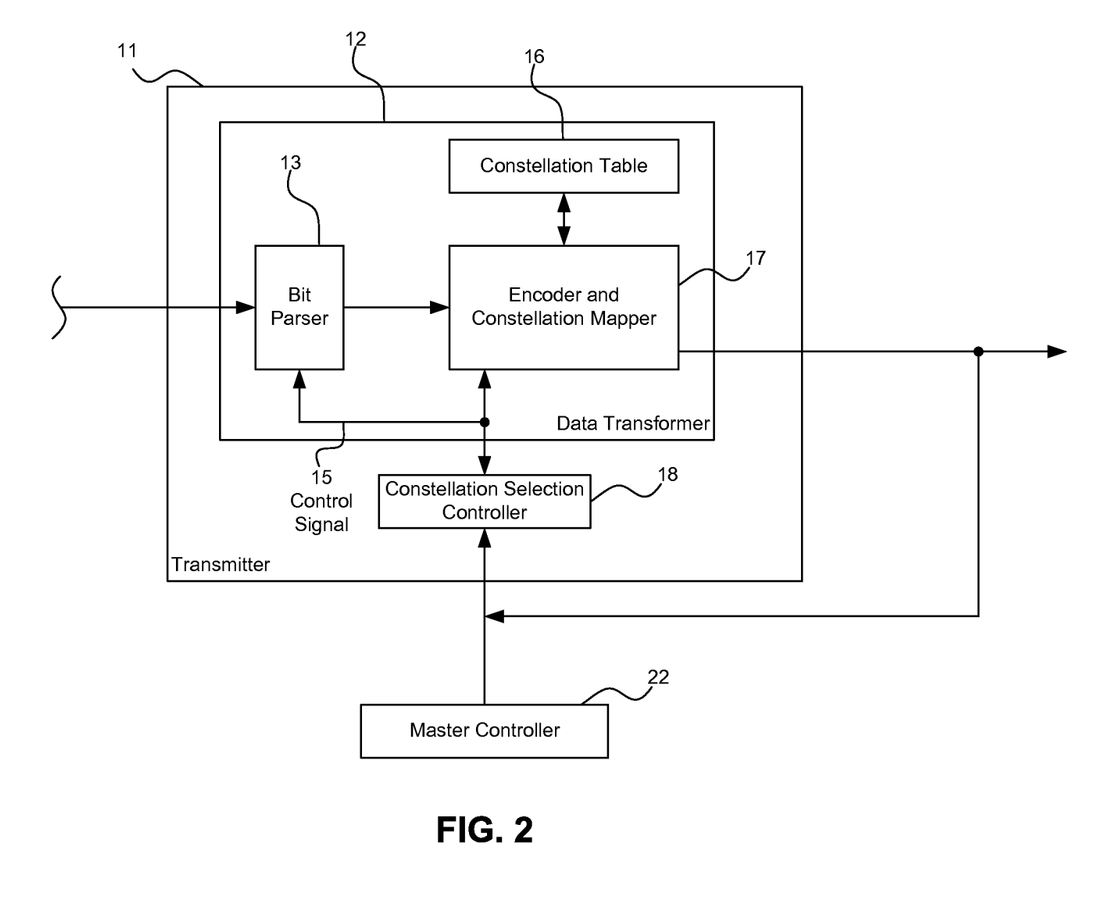
FIG. 2 is a block diagram illustrative of a first exemplary embodiment of the present invention, in the form of a transmitter.

Having described the general inventive concept, a more detailed embodiment will now be described. In FIG. 2, transmitter 11 includes data transformer 12 and constellation selection controller 18. Data transformer 12 can include bit parser 13, encoder and constellation mapper 17, and constellation table 16. Constellation selection controller 18 employs control signal 15 to govern the operation of parser 13, as well as the operation of encoder and mapper 17. For example, relative to the operation of bit parser 13, controller 18 can govern the selection of the selectable predetermined integer number of data bits per bit vector; relative to the operation of encoder and mapper 17, controller 18 can govern the selection of the constellation alphabet used during a particular interval, and the level of redundancy and correlation imposed upon the transmission symbols prior to transmission via channel output data stream 19.

Figure 3:
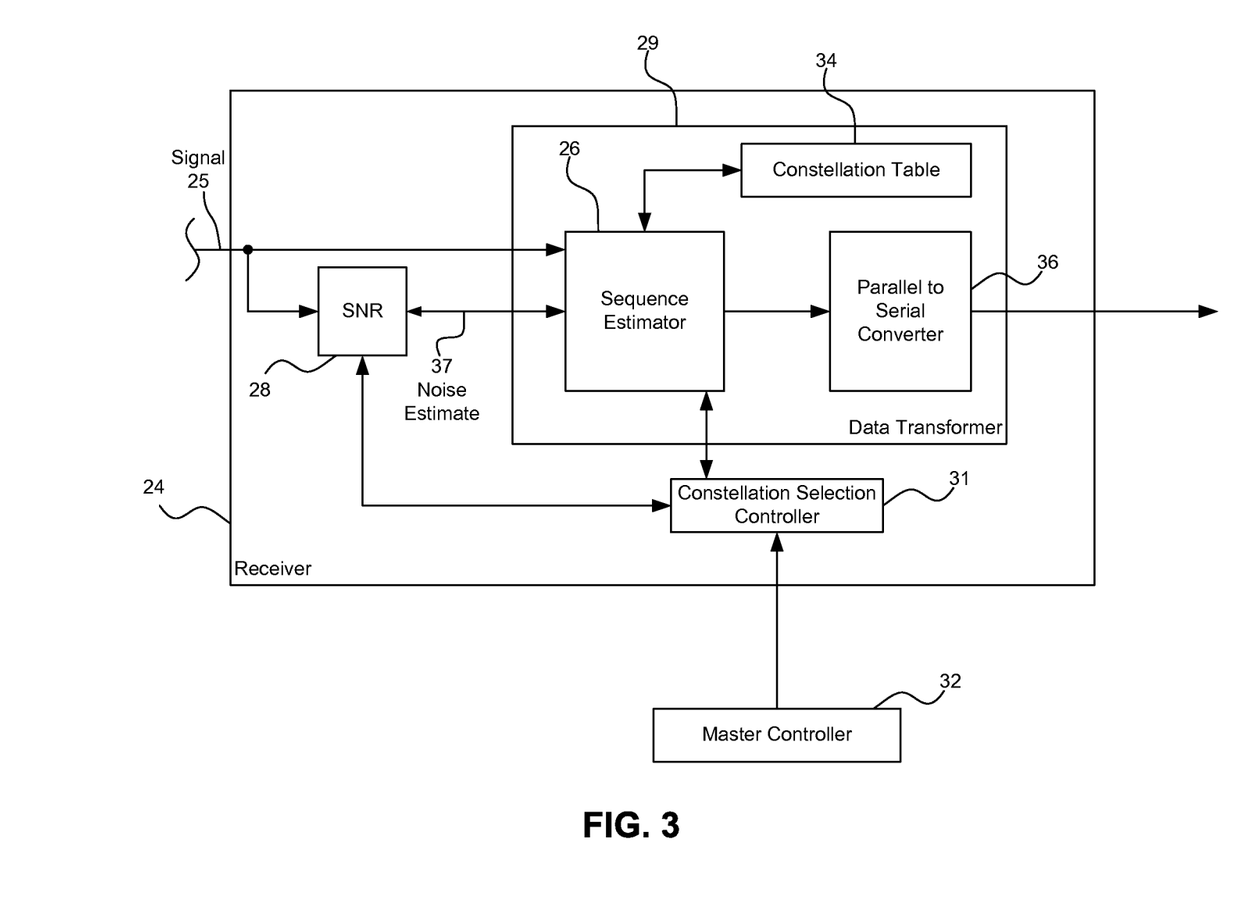
FIG. 3 is a block diagram illustrative of a first exemplary embodiment of the present invention, in the form of a receiver implementing sequence and noise estimation.

In FIG. 3, receiver 24 includes a noise estimator 28, a sequence estimator 26, a constellation selection controller 31, a constellation table 34, and a parallel-to-serial converter 36. It will be readily apparent that data transformer 29, which can include estimator 26, table 34 and converter 36 is functionally equivalent to data transformer 4 in FIG. 1. Although noise estimator 28 is illustrated to be external to data transformer 29, yet within receiver 24, it also may be grouped within data transformer 29, or even be external to receiver 24. It is desirable that constellation selection controller 31 be responsive to a channel condition, such as the signal-to-noise ratio or strength of received symbol and noise 25.

The transmission symbols carried upon the received signal 25 are known to be corrupted, or tagged, by some amount of channel noise. Noise estimator 28 is employed to quantify the amount of channel noise present in signal 25. Noise estimate 37 is received by sequence estimator 26 such that a reasonably good estimate of the transmission symbol originally transmitted to receiver 24 can be derived. Although one skilled in the art would recognize that many implementations of received signal estimation can be used to effect recovery of the transmitted signal, the skilled practitioner also would realize that it is desirable to employ a maximum likelihood sequence estimator (MLSE) as sequence estimator 26 in receiver 24 for optimized data reception. One such MLSE can be realized with a Viterbi decoder. A MLSE typically is used for decoding a convolutional code, a trellis code, as well as received symbols with partial response, and can be advantageous in the presence of channel noise such as intersymbol interference. In decoding a constellation-multiplexed (CM) signal, such as described herein, a MLSE can take advantage of the SNR information of each symbol at the receiver and produce a maximum likelihood estimation of CM signals that can approach optimality.

Constellation selection controller 31 can assign each received symbol in the MLSE with an appropriate constellation mapping, and its associated data bits per transmission symbol. Based on the assigned constellation mapping, not only does the MLSE compute path metrics of a received symbol accordingly, it also can scale the branch metrics according to the maximum likelihood estimation criterion. As above, constellation selection controller 31 directs parallel-to-serial converter 36 to output corresponding data bits in each symbol. It is desirable for synchronization to be established between the constellation selection controller of a transmitter and the constellation selection controller of a corresponding receiver.

Figure 4:
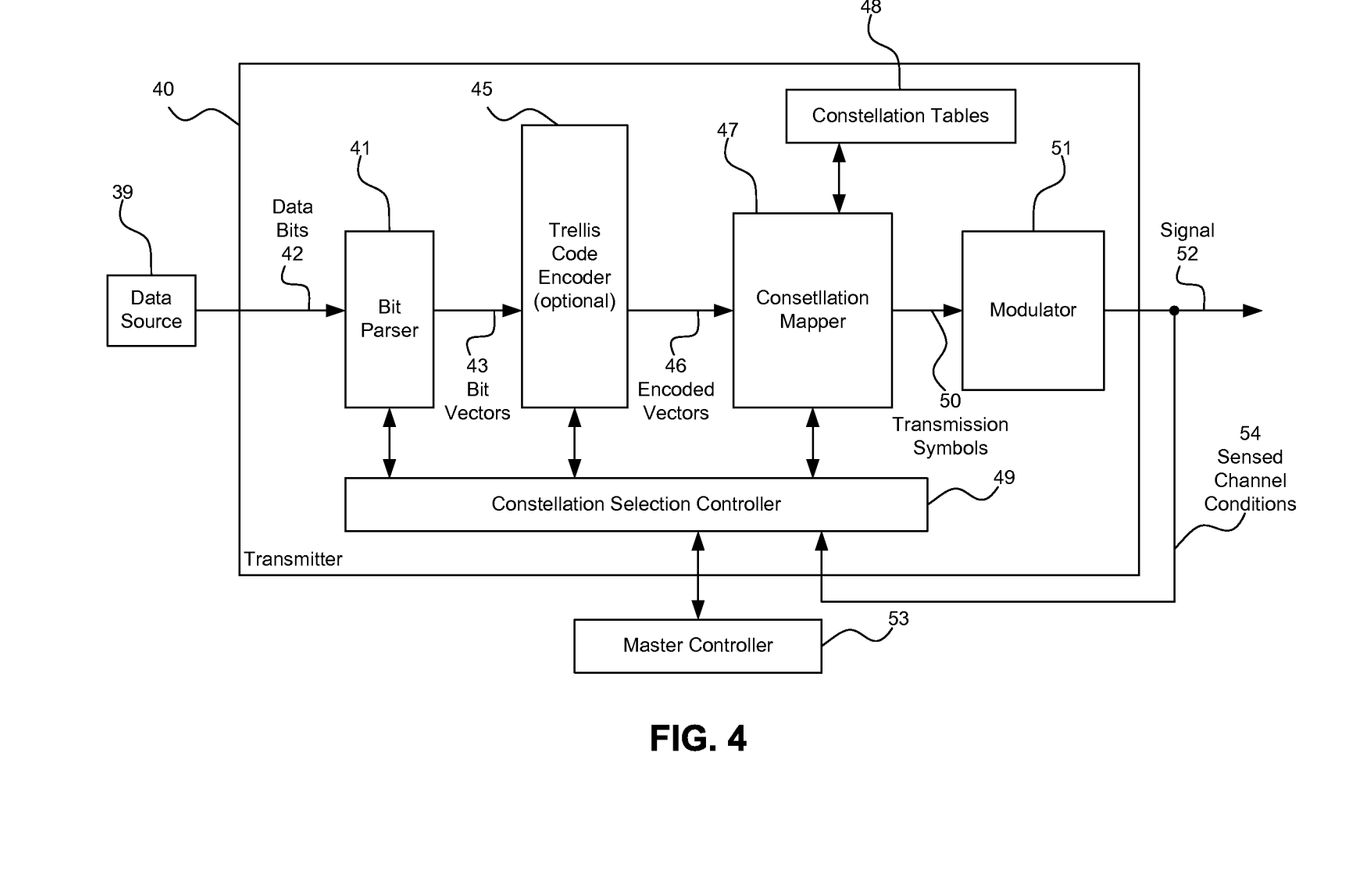
FIG. 4 is a block diagram of another exemplary embodiment of a transmitter illustrative of a trellis encoding implementation as an option.

Another exemplary embodiment of the present invention, in the form of constellation-multiplexed transmitter 40, is illustrated in FIG. 4. Here transmitter 40 includes a bit parser 41, trellis code encoder 45 as an option, constellation mapper 47, constellation tables 48, modulator 51, and constellation selection controller 49. Furthermore, controller 49 itself may be governed by master control 53. The master control could be a corresponding controller on a corresponding receiver.

Without loss of generality, it is useful to illustrate the principles of the present invention with a specific example where k and p/q information bits are transmitted per symbol, and where k, p and q are integers, and p is smaller than q. The illustration is by way of three examples. For each example, it is assumed that the interval over which the average data bit rate is to be measured includes the communication of eight symbols; that the average data bit rate may be a non-integer; that each symbol is composed of a single data bit vector; and that the data bit vector is composed of a selectable predetermined integer number of data bits, say k and k+1 data bits.

In the first example, when the data bit rate is desired to be, for example, 7.073 data bits per transmitted symbol, preferred embodiments of the present invention can select the predetermined integer number of data bits, e.g., k data bits, to be 7 data bits, and the second predetermined integer number of data bits, e.g., k+1 data bits, to be 8 data bits. To achieve the desired 7.073 data bits per transmitted symbol data bit rate, bit parser 41 can selectively and adaptively partition the stream of incoming data bits 42 into seven seven-bit data bit vectors, and one eight-bit data vector, each of the data bit vectors being grouped as a transmission symbol, and mapped to a signal constellation of competent configuration. In this case, one power-of-two signal constellation ($2^3=8$ signal values) can be used for all transmission symbols. The resulting predetermined data bit rate is about 7.125 data bits per transmitted symbol (k=7, p=1, q=8), easily accommodating the 7.073 data bits per transmitted symbol.

In the second example, it is desired that the data bits per transmitted symbol be increased to about 7.771 data bits per transmitted symbol, for example, in response to improved channel conditions. Bit parser 41 can selectively and adaptively partition the stream of incoming data bits 42 into one, seven-bit data bit vector (k=7), and one eight-bit data vector (k+1=8), each of the data bit vectors being grouped as a transmission symbol, and mapped to a signal constellation of competent configuration. In this case, one power-of-two signal constellation ($2^3=8$ signal values) can be used for all transmission symbols. The resulting predetermined data bit rate is about 7.875 data bits per transmitted symbol (k=7, p=7, q=8), easily accommodating the 7.771 data bits per transmitted symbol.

In the third example, should the desired data bits per transmitted symbol over the measuring interval again be increased, for example, in response to further improved channel conditions, and a data bit rate of about 8.198 data bits per transmitted symbol is desired, bit parser 41 can selectively and adaptively partition the stream of incoming data bits 42 into six, eight-bit data bit vectors (k=8), and two nine-bit data vector (k+1=9), each of the data bit vectors being grouped as a transmission symbol, and mapped to a signal constellation of competent configuration. In this case, two power-of-two signal constellations ($2^3=8$ signal values and $2^4=16$ signal values) can be used, the first, smaller signal constellation accommodating eight-bit transmission symbols; the second, larger signal constellation accommodating eight-bit transmission symbols. The resulting predetermined data bit rate is about 8.250 data bits per transmitted symbol (k=8, p=2, q=8), easily accommodating the 8.198 data bits per transmitted symbol.

The foregoing, being solely for the purpose of illustration, does not limit the invention herein to measuring intervals having eight symbols, symbols being composed of seven, eight, or nine bits, transmission symbols being composed of a single data bit vector, or require any particular signal constellation configuration to be used. In view of the present disclosure, skilled artisans could easily adapt the various embodiments of the present invention, whether a transmitter, a receiver, a system, or a portion thereof, to achieve a desired data bit rate by composing data bit vectors having selectable predetermined integer number of data bits, and grouping the data bit vectors to achieve the desired ends.

At the transmitter 40, bit parser 41 can receive an input bit stream 42 at a rate of k and p/q bits per symbol. Bit parser 41 selectively partitions incoming data bits 42 into bit vectors 43. It is desired that the partitioning be performed continuously. Parser 41 sends bit vector 43 composed of a selectable predetermined integer number of data bits, for example, k or k+1 data bits, to an optional trellis code encoder 45 under the direction of constellation selection controller 49. After encoder 45 imposes a predetermined correlation between successive output bit vectors 43 from bit parser 41, the resultant encoded vectors 46 are then mapped to corresponding transmission symbols 50 by way of constellation mapper 47.

Constellation mapper 47 can employ constellation table 48 to map each vector into transmission symbol 50 that is a member of one or more preselected symbol alphabets which themselves can correspond with a symbol constellation. Constellation selection controller 49 can continuously govern the selectable predetermined integer number of data bits grouped into a bit vector according to a particular predetermined pattern. In the exemplary embodiment of the invention herein, each predetermined pattern is representative of a preselected signal constellation, having a selectable predetermined integer number of data bits per symbol, for example, k or k+1 integer bits per symbol.

Note that constellation mapper 47 can map vectors 43 directly from bit parser. In this case, the system is an uncoded one, and no correlation may be imposed on transmitted symbols. The correlations will be imposed on received symbols at its receiver by forming a pre-defined partial response for the received symbols. However, in some embodiments, where it is desirable to employ encoder 45, bit parser 41 first directs the bit vector to encoder 45. Encoder 45 imparts a pre-determined correlation among data, in this case, between successive output vectors.

Constellation selection controller 49 can govern the selection between selectable predetermined integer numbers of data bits, e.g., k and k+1 data bits, in bit vector 43 from bit parser 41, such that the average transmitted bits per symbol 50 is k and p/q 41 e.g., 3.25). Controller 49 also can direct the trellis code encoder 45, or constellation mapper 47, or both, to choose the desired constellation size based on the number of bits to be transmitted via the transmission symbol at hand. Where it is desired to further process transmission symbols 50 into signals 52 better suited for a particular transmission format, modulator 51 may be used. Responsive to modulator 51, consecutive symbols can be transmitted at different time stamps, or at different frequency locations, or both.

As in previous embodiments of the present invention constellation selection controller 49 is desired to be responsive to a sensed channel condition 54; or to a master control 53 which may be external to transmitter 40, for example, from a corresponding receiver.

Figure 5A:
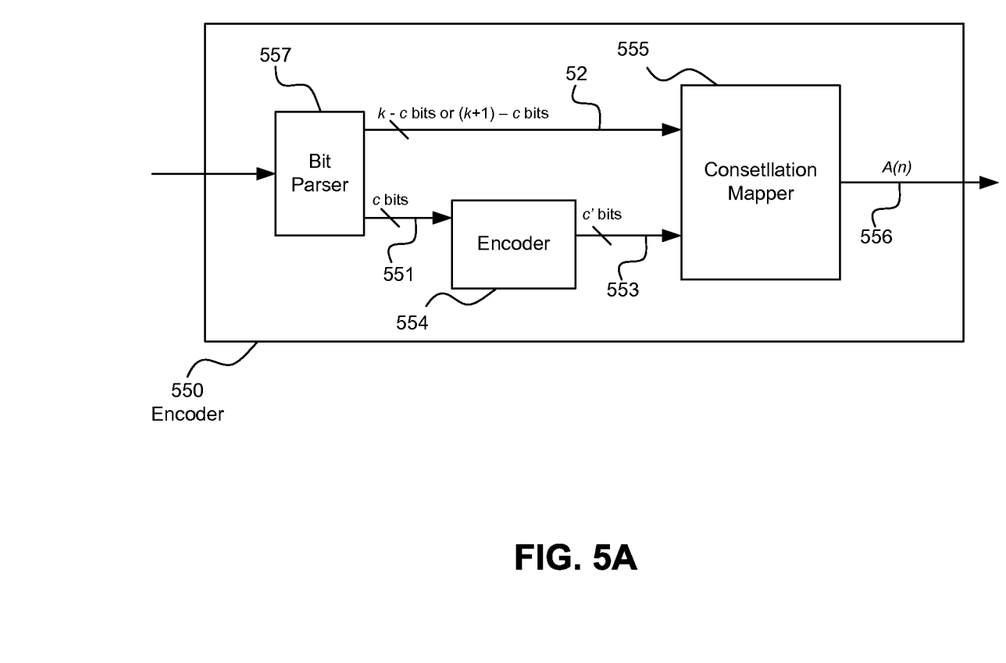
FIG. 5a is a block diagram illustrative of a exemplary transmitter embodiment intended for single symbol encoding.
Figure 5B:
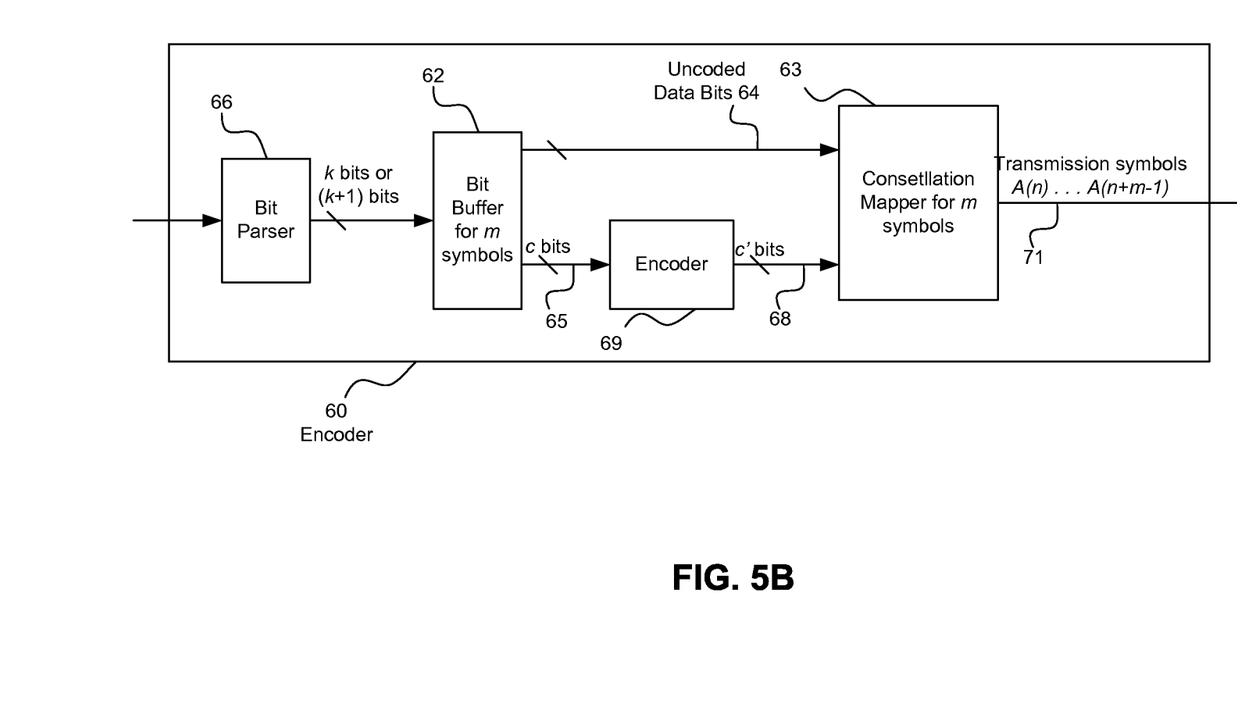
FIG. 5b is a block diagram illustrative of a exemplary transmitter embodiment intended for multiple symbol encoding.

The optional trellis code used in a system according to the invention herein could be a single symbol code or a multi-symbol code. FIG. 5(a) shows an encoder 50 that implements a single-symbol trellis code in which c data bits 51, out of each k or k+1 selectable predetermined integer number of data bits 52, provided as data bit vectors by parser 57, are encoded to c' data bits 53 through, for example, a convolutional encoder 54. Constellation mapper 55 converts the encoded data bits 53 and uncoded data bits 51 into a transmission symbol 56 in the desired information format. FIG. 5(b) shows an example of an encoder 60 implementing an m-symbol trellis code, in which data bit parser 66 provides a selectable predetermined integer number of data bits, e.g., k or k+1 input data bits, corresponding to a single transmission symbol, with m symbols 67 being buffered in symbol buffer 62 before being encoded. Among these selectable predetermined integer number of input bits of the m transmission symbols 67, c data bits 65 are encoded to c' data bits 68 again, for example, through encoder 69 which may be a convolutional encoder. These c' data bits 68 are combined with uncoded data bits 64 and are mapped in constellation mapper 63 into m consecutive transmission symbols 71 in preparation for transmission. Note that the m consecutive transmission symbols do not necessarily use the same constellation.

Figure 6:
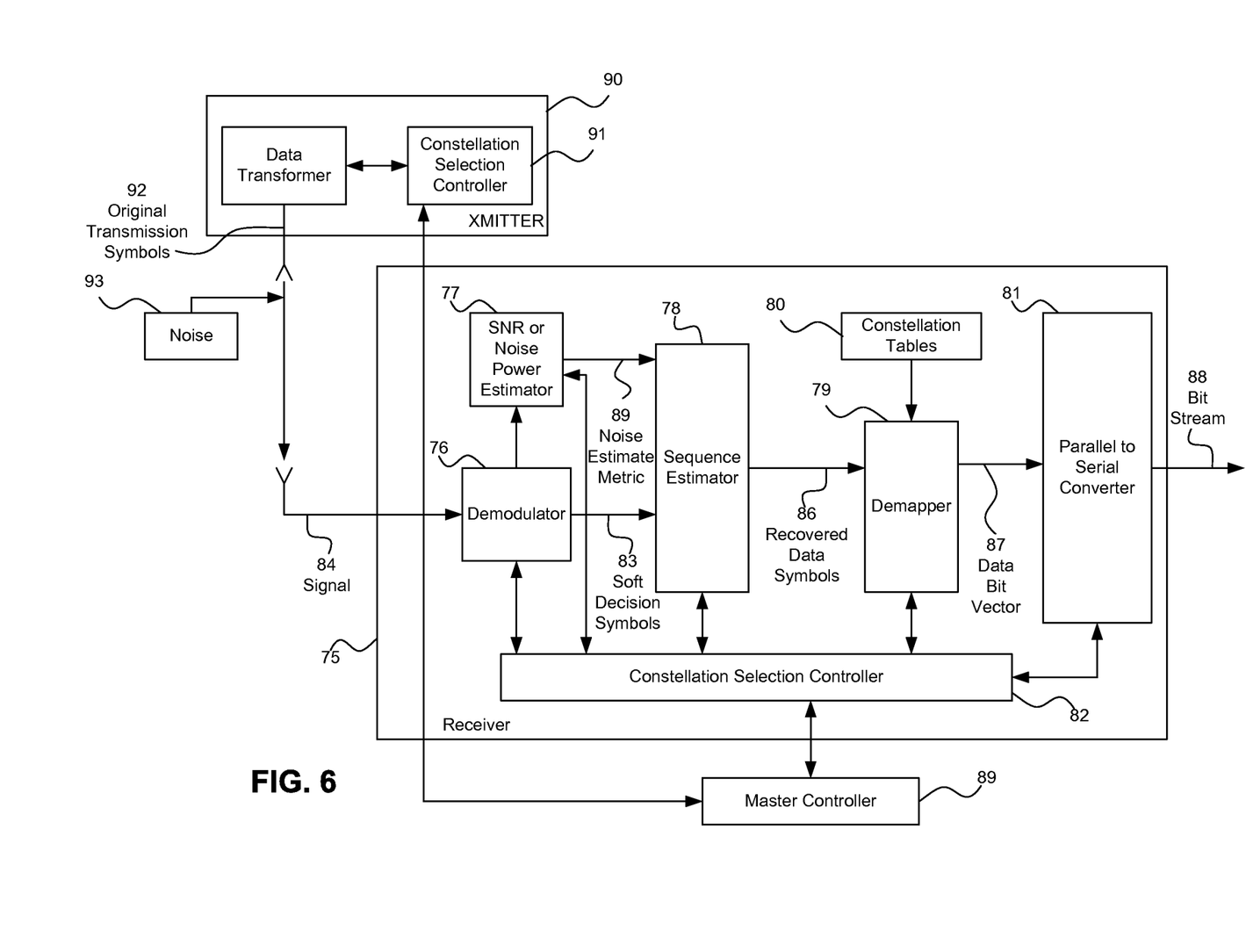
FIG. 6 is a block diagram of another exemplary embodiment of a receiver illustrative of an implementation of demodulation, sequence and noise estimation.

In FIG. 6, receiver 75, which is preferred to be a maximum-likelihood sequence estimator receiver, includes a demodulator 76, noise estimator 77, sequence estimator 78, demapper 79, constellation tables 80, parallel-to-serial converter 81, and constellation selection controller 82. Demodulator 76 recovers received soft-decision symbols $r_m$ 83 from received signal 84, which signal 84 contains original transmission symbols 92 from constellation-multiplexing transmitter 91, corrupted by channel noise 93. Transmission symbols 92 may be transmitted in signal 84 at different time stamps, different frequency locations, or both. In the case where the transmission symbols 84 were not first encoded in the transmitter 90, it is desired that demodulator 76 forms a partial response on the received symbols so that a defined correlation, which may exist between received soft-decision symbols $r_m$ 83, can be utilized. It is desirable for noise estimator 77 to associate a noise estimate metric 89 with each soft-decision symbol 83; the noise estimate metric being, for example, a noise power estimate metric or a SNR estimate metric.

Sequence estimator 78 determines recovered data symbols $a_{\hat{k},m}$ 86 on the basis of the predetermined correlation among consecutive symbols 83 output by demodulator 76. It is desired to incorporate noise estimate metric 89 in extracting a sequence of symbols 86 from symbols 83. Indeed, it is desired to use a MLSE as sequence estimator 78, and that noise estimate metric 89 be used to compute the likelihood metric of each considered sequence. Where a sequence is selected to be the most likely transmitted sequence based on the likelihood metric, the quality of recovered data symbols 86 can approach optimality, in the maximum likelihood sense.

One method for describing the operation of MLSE 78 is as follows:

In general, it is desirable for sequence estimator 78 to find a sequence $\{a_{\hat{k},m}\}$ at its output such that either of the following noise-power weighted Euclidean distances is minimized:

$$\sum_m \frac{(r_m - a_{k,m})^2}{N_m}$$

or $$\sum_m \frac{SNR_m (r_m - a_{k,m})^2}{S_{A_m}}$$

where
each $a_{\hat{k},m} \in \{a_{\hat{k},m}\} \equiv A_m$
m is a symbol index;
k is an alphabet index;
$\hat{k}$ is the decided alphabet index;
$A_m$ is a set of alphabets used for symbol m;
$N_m$ is the estimated noise power associated with symbol $r_m$;
$SNR_m$ is the SNR associated with the symbol $r_m$; and
$S_{A_m}$ is the average signal power associated with the alphabet set used for $r_m$.

This is because in the presence of, for example, noise whose power varies across different symbols, the maximum likelihood decoding essentially consists of finding that particular path through the trellis with the minimum-weighted-squared-Euclidean distance to the received sequence, where, in computing the path metric, each branch metric is weighted by the inverse of the noise power associated with the soft-decision symbol. It is preferred that the minimum-weighted-squared-Euclidean distance of the particular path be a substantially minimum noise-power-inversely-weighted-squared-Euclidean distance. Recovered data symbols 86 are received from MLSE 78 by demapper 79 and, in conjunction with constellation tables 80, maps a recovered symbol 86 onto a data bit vector 87, the size of which vector may vary between successive symbols. Tables 80 typically corresponds to similar constellation tables in transmitter 90. As bit vectors 87 are generated by demapper 75, parallel-to-serial converter 81 converts vectors 87 into a bit stream 88 that corresponds to the data bit stream originally input to transmitter 90. Similar to the operation of constellation selection controller 49 in FIG. 4, constellation selection controller 82 can inform demodulator 76, sequence estimator 78, demapper 79, and parallel-to-serial converter 81 of the pertinent details of the constellation being implemented at a particular moment, such as the current symbol alphabet and the number of bits in recovered symbol 86. As with a constellation selection controller 91 in transmitter 90, it is desirable for controller 82 to allow different sets of symbol alphabets and provide a variable number of bits in a symbol, responsive to a channel state. It is desirable to provide some form of synchronization between the constellation selection controller 91 in transmitter 90, and the constellation selection controller 82 in receiver 75.

Although the invention is illustrated herein as being implemented with discrete functional building blocks, e.g., trellis encoders, constellation mappers, etc., the functions of any one or more of those building blocks can be carried out using one or more appropriate programmed, processors, digital signal processing (DSP) chips, etc. It should be noted that the principles of the invention are also applicable to other areas of communications. For example, the principles of the invention can also be applied to the design of modems for use in data communications, to fading channel applications, and so on.

The various constellations, bit and baud rates, and other parameters are, of course; merely illustrative. Moreover, the invention can be described herein in the context of multiple amplitude/multiple phase constellations, conventionally known as "QAM", it is equally applicable to other types of constellations, such as constant amplitude/multiple phase constellations, such as M-PSK and M-DPSK. The device and method according to the method herein provides for symbols to be transmitted across the channel at different time stamps (such as using a QAM technology); at different frequency locations; or through a combination of both (such as using an OFDM technology). Additionally, the invention described herein may be applied to contexts of voiceband data transmission, cellular mobile radio, digital microwave radio, satellite communications, wire communications, wireless communications, and the like.

The foregoing merely illustrates the principles of the invention, and it will thus be appreciated that those skilled in the art will be able to devise various alternative arrangements which, although not explicitly described herein, embody the principles of the invention within the spirit and scope of the following claims.

It is claimed:

1. A communication device comprising:
a controller operably coupled with a data transformer, the data transformer being responsive thereto, the controller adaptively selecting a predetermined integer number of data bits and an integer number of data bit vectors to communicate data through a data channel at a predetermined data bit rate in response to a data channel condition,
wherein each of the selected integer number of data bit vectors has one of a first predetermined integer number of data bits and a second predetermined integer number of data bits represented therein; and
wherein the data transformer reversibly groups ones of the first predetermined integer number of data bits into selected ones of the integer number plurality of data bit vectors and ones of the second predetermined integer number of data bits into selected others of the integer number of data bit vectors.

2. The communication device of claim 1, wherein the data transformer is further configured to form a transmission symbol comprising one data bit vector having one of the first predetermined integer number of data bits and the second predetermined integer number of data bits represented therein.

3. The communication device of claim 2, wherein the data transformer selects successive ones of a plurality of transmission symbols according to one of a preselected coding method and an unencoded method.

4. The communication device of claim 3, wherein the data transformer dynamically selects a predetermined correlation between successive ones of the plurality of transmission symbols.

5. The communication device of claim 3, wherein the data transformer continuously selects a predetermined correlation between successive ones of the plurality of transmission symbols.

6. The communication device of claim 2, wherein the data transformer selects a predetermined correlation between successive ones of a plurality of transmission symbols, according to a preselected coding method.

7. The communication device of claim 6, wherein the preselected coding method is constellation-multiplexed coding.

8. The communication device of claim 1, wherein the data comprises time domain data.

9. The communication device of claim 1, wherein the data channel condition comprises at least one of received power, signal-to-noise ratio, and an input from a master control.

10. The communication device of claim 1, wherein the data comprises frequency domain data.

11. A method comprising:
selecting, by a controller, a predetermined integer number of data bits and an integer number of data bit vectors to communicate data through a data channel at a predetermined data bit rate in response to a data channel condition, wherein each of the selected integer number of data bit vectors has one of a first predetermined integer number of data bits and a second predetermined integer number of data bits represented therein; and
reversibly grouping, by a data transformer, ones of the first predetermined integer number of data bits into selected ones of the integer number of data bit vectors and ones of the second predetermined integer number of data bits into selected others of the integer number of data bit vectors, wherein the controller is operably coupled with the data transformer.

12. The method of claim 11, further comprising:
forming a transmission symbol comprising one data bit vector having one of the first predetermined integer number of data bits and the second predetermined integer number of data bits represented therein.

13. The method of claim 12, further comprising:
selecting, by the data transformer, successive ones of a plurality of transmission symbols according to one of a preselected coding method and an unencoded method.

14. The method of claim 13, further comprising:
dynamically selecting, by the data transformer, a predetermined correlation between successive ones of the plurality of transmission symbols.

15. The method of claim 13, further comprising:
continuously selecting, by the data transformer, a predetermined correlation between successive ones of the plurality of transmission symbols.

16. The method of claim 12, further comprising:
selecting, by the data transformer, a predetermined correlation between successive ones of a plurality of transmission symbols, according to a preselected coding method.

17. The method of claim 16, wherein the preselected coding method is constellation-multiplexed coding.

18. The method of claim 11, wherein the data comprises time domain data.

19. The method of claim 11, wherein the data channel condition comprises at least one of received power, signal-to-noise ratio, and an input from a master control.

20. The method of claim 11, wherein the data comprises frequency domain data.

* * * * *

UNITED STATES PATENT AND TRADEMARK OFFICE
CERTIFICATE OF CORRECTION

PATENT NO. : 8,462,837 B2  
APPLICATION NO. : 13/273911  
DATED : June 11, 2013  
INVENTOR(S) : Lin et al.

Page 1 of 1

It is certified that error appears in the above-identified patent and that said Letters Patent is hereby corrected as shown below:

In the Claims

Claim 1, column 9, Line 25, replace "number plurality of data bit" with --number of data bit--.

Signed and Sealed this  
Thirtieth Day of July, 2013

Teresa Stanek Rea  
*Acting Director of the United States Patent and Trademark Office*